US012594814B2

(12) United States Patent
Lee et al.

(10) Patent No.: US 12,594,814 B2
(45) Date of Patent: Apr. 7, 2026

(54) VEHICLE AND CONTROL METHOD THEREOF

(71) Applicants:Hyundai Motor Company, Seoul (KR); Kia Corporation, Seoul (KR)

(72) Inventors: Tae Hee Lee, Yongin-si (KR); Dae Un Sung, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 506 days.

(21) Appl. No.: 18/065,790

(22) Filed: Dec. 14, 2022

(65) Prior Publication Data

US 2023/0226883 A1 Jul. 20, 2023

(30) Foreign Application Priority Data

Jan. 18, 2022 (KR) ........................ 10-2022-0007128

(51) Int. Cl.
*B60H 1/00* (2006.01)
(52) U.S. Cl.
CPC ......... *B60H 1/00821* (2013.01); *B60H 1/008* (2013.01); *B60H 1/00792* (2013.01); *B60H 1/00985* (2013.01)
(58) Field of Classification Search
CPC ... B60H 3/0085; B60H 1/008; B60H 1/00849
USPC ........................................................ 454/75
See application file for complete search history.

(56) References Cited

U.S. PATENT DOCUMENTS

| | | | | |
|---|---|---|---|---|
| 6,758,739 B1 * | 7/2004 | Sangwan | ............. | B60H 3/0085 |
| | | | | 454/75 |
| 10,928,369 B2 | 2/2021 | Herrier et al. | | |
| 2012/0264361 A1 * | 10/2012 | Scheer | ................. | B60H 3/0035 |
| | | | | 454/75 |
| 2014/0023557 A1 | 1/2014 | Tian et al. | | |
| 2014/0137636 A1 | 5/2014 | Lee et al. | | |

(Continued)

FOREIGN PATENT DOCUMENTS

| | | | | |
|---|---|---|---|---|
| DE | 102005012502 B4 * | 1/2019 | ......... | B01D 46/0086 |
| JP | 2001061952 A | 3/2001 | | |

(Continued)

OTHER PUBLICATIONS

Machine Translation of DE 102005012502 (Year: 2019).*
Ministry of Intellectual Property, Office action dated Feb. 9, 2026, total pages 6.

*Primary Examiner* — Allen R. B. Schult
*Assistant Examiner* — Amy E Carter
(74) *Attorney, Agent, or Firm* — Slater Matsil, LLP

(57) ABSTRACT

An embodiment vehicle includes an air conditioner, a plurality of odor sensing modules provided in an interior of the vehicle or inside the air conditioner, each of the odor sensing modules including a plurality of gas sensors, and a controller configured to determine whether to initiate a process of determining an occurrence of a bad smell based on state information of the vehicle or state information of the air conditioner, in response to a determination to initiate the process of determining the occurrence of the bad smell, to determine odor data based on an output of at least one of the odor sensing modules, to determine whether the bad smell has occurred based on the odor data, and in response to a determination that the bad smell has occurred, to control to provide notice of or to remove the bad smell.

20 Claims, 10 Drawing Sheets

(56)     References Cited

U.S. PATENT DOCUMENTS

| | | | |
|---|---|---|---|
| 2018/0057013 A1* | 3/2018 | Mullett | B60H 1/267 |
| 2019/0193528 A1* | 6/2019 | Hattori | B60H 3/06 |
| 2020/0256793 A1 | 8/2020 | Hou-Broutin et al. | |
| 2020/0298649 A1* | 9/2020 | Gutowski | B60H 1/00764 |
| 2021/0192666 A1* | 6/2021 | Saito | G06Q 10/06315 |
| 2021/0221388 A1* | 7/2021 | Zemek | G08G 1/127 |
| 2022/0054966 A1* | 2/2022 | Varughese | B60H 1/008 |
| 2022/0252566 A1 | 8/2022 | Yun et al. | |

FOREIGN PATENT DOCUMENTS

| | | | |
|---|---|---|---|
| JP | 5723421 B2 | 5/2015 |
| JP | 2017052339 A | 3/2017 |
| JP | 6862201 B2 | 4/2021 |
| KR | 101449145 B1 | 10/2014 |
| KR | 20160003239 A | 1/2016 |
| KR | 20180047539 A | 5/2018 |
| KR | 102240397 B1 | 4/2021 |
| KR | 20210059530 A | 5/2021 |
| KR | 20210111607 A | 9/2021 |
| KR | 20220025651 A | 3/2022 |
| KR | 20220025654 A | 3/2022 |
| KR | 20220025655 A | 3/2022 |

* cited by examiner

FIG. 3

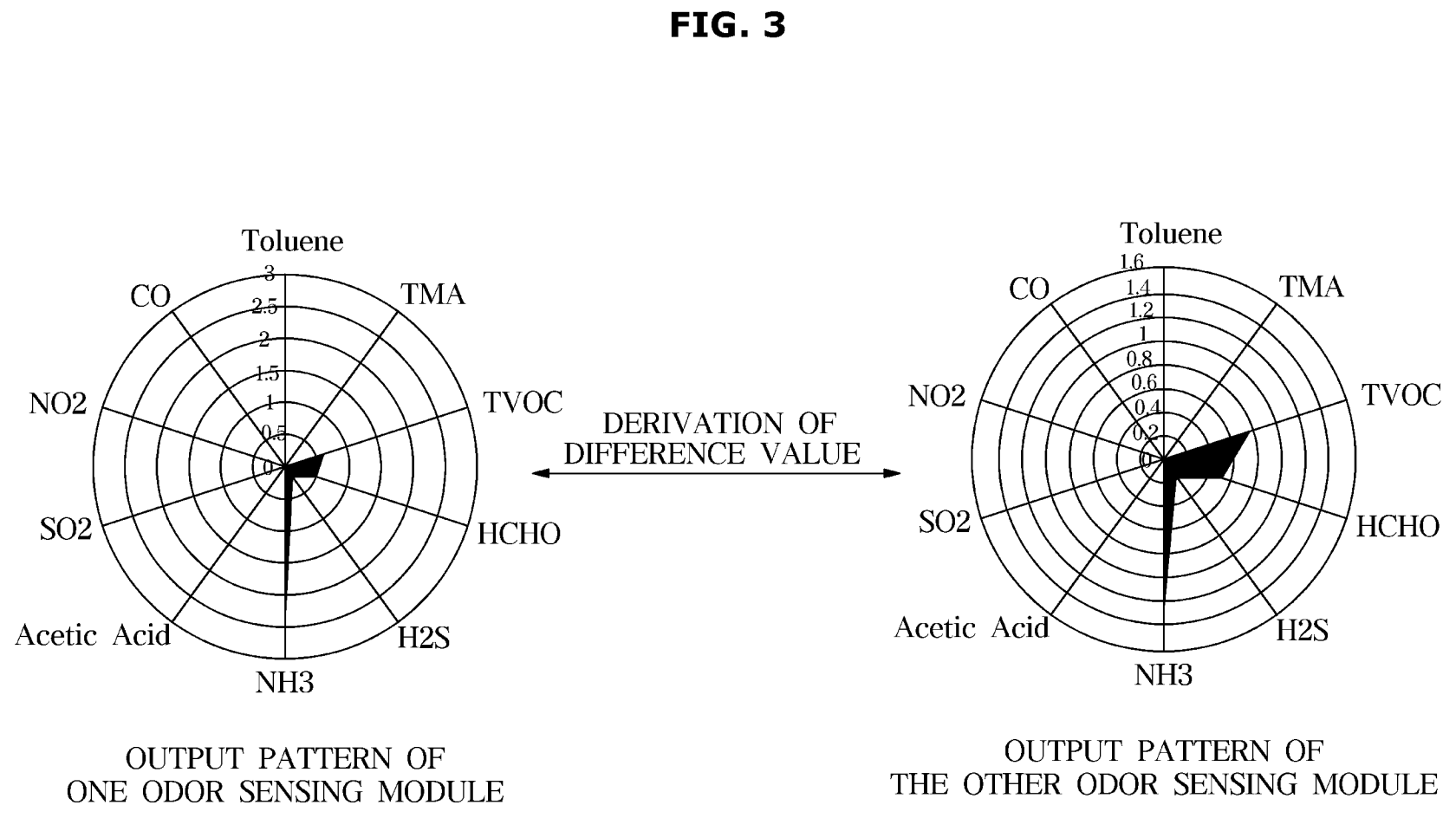

OUTPUT PATTERN OF
THE OTHER ODOR SENSING MODULE

DERIVATION OF
DIFFERENCE VALUE

OUTPUT PATTERN OF
ONE ODOR SENSING MODULE

FIG. 6

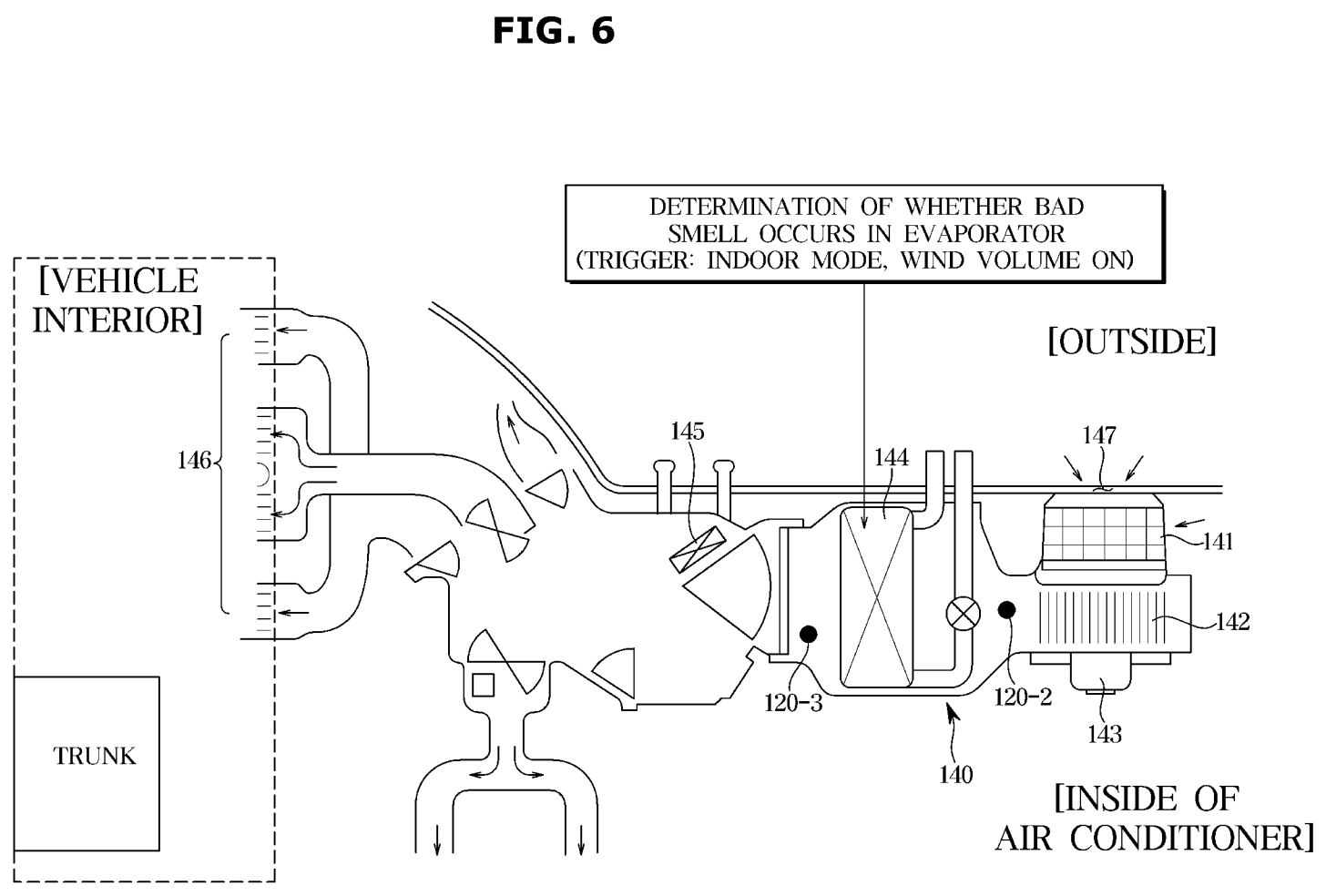

DETERMINATION OF WHETHER BAD SMELL OCCURS IN EVAPORATOR (TRIGGER: INDOOR MODE, WIND VOLUME ON)

[OUTSIDE]

[INSIDE OF AIR CONDITIONER]

[VEHICLE INTERIOR]

TRUNK 141
142
143
147
120-2
140
144
120-3
145
146

DETERMINATION OF WHETHER BAD SMELL OCCURS IN HEATER (TRIGGER: INDOOR MODE, WIND VOLUME ON)

[OUTSIDE]

[INSIDE OF AIR CONDITIONER]

[VEHICLE INTERIOR]

TRUNK

FIG. 8

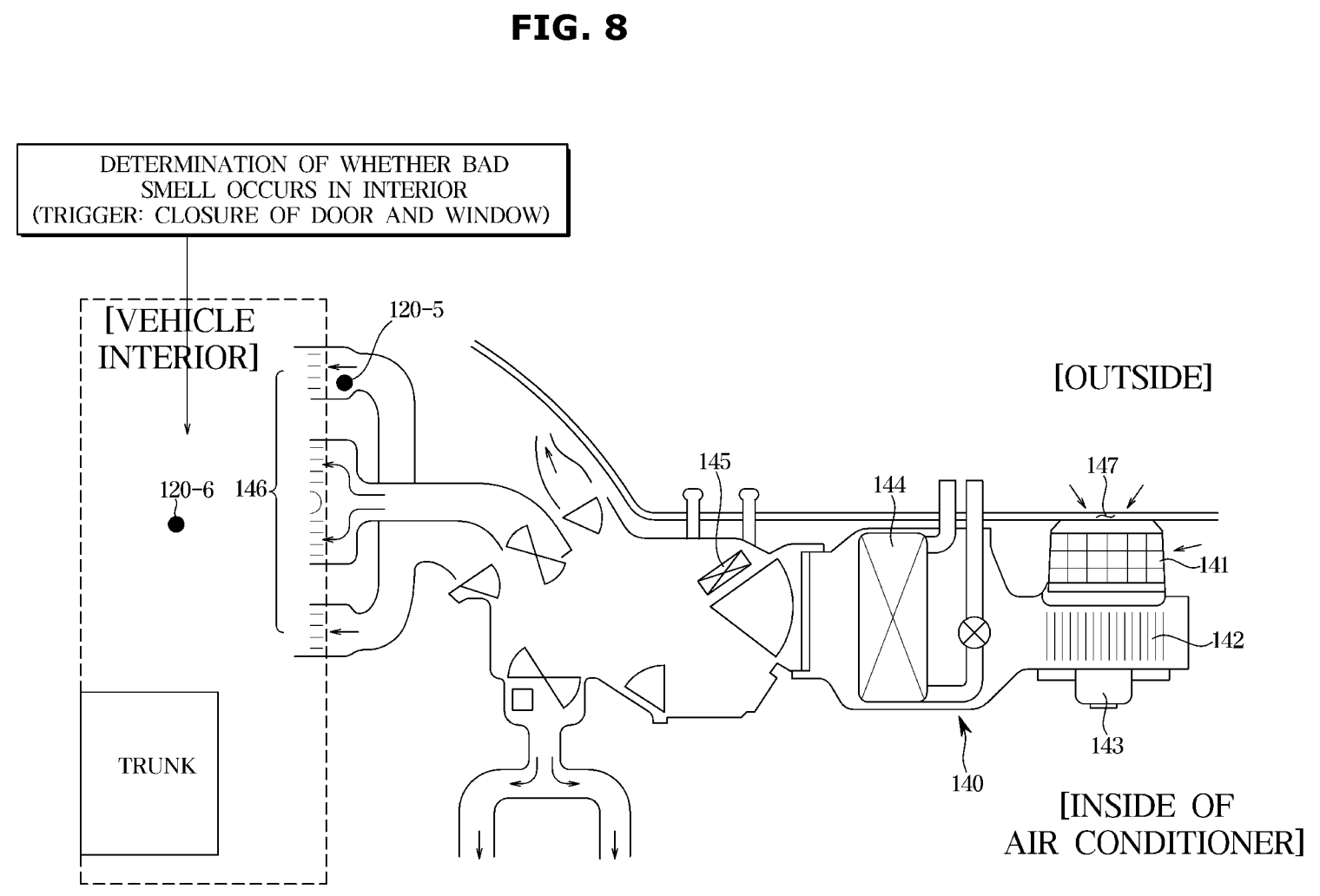

[OUTSIDE]

[INSIDE OF AIR CONDITIONER]

147

141

142

143

140

144

145

120-5

120-6  146

[VEHICLE INTERIOR]

TRUNK

DETERMINATION OF WHETHER BAD SMELL OCCURS IN INTERIOR (TRIGGER: CLOSURE OF DOOR AND WINDOW)

VEHICLE AND CONTROL METHOD THEREOF

CROSS-REFERENCE TO RELATED APPLICATIONS

This application claims the benefit of Korean Patent Application No. 10-2022-0007128, filed on Jan. 18, 2022, which application is hereby incorporated herein by reference.

TECHNICAL FIELD

The disclosure relates to a vehicle and a control method thereof.

BACKGROUND

An odor may be derived as a result of mixing various gas components, and in recent years, it has become possible to distinguish odors by using component ratios of mixed gases or concentrations of individual gases based on outputs of a plurality of gas sensors.

In addition, recently, a car-sharing service that shares a vehicle is being provided, and an autonomous driving service that minimizes driver intervention is being provided. However, in the case of a shared vehicle or an autonomous driving vehicle, intervention of a manager may be neglected, and an odor, that is, a bad smell, may not be managed.

Because displeasure of a vehicle occupant may increase when a bad smell occurs, it is necessary to study how to deal with the bad smell while minimizing the intervention of the manager.

SUMMARY

The disclosure relates to a vehicle and a control method thereof. Particular embodiments relate to a vehicle capable of detecting an odor and a control method thereof.

An embodiment of the disclosure provides a vehicle capable of detecting whether a bad smell occurs based on outputs of a plurality of odor sensing modules provided at different positions, and guiding or removing the occurred bad smell, and a control method thereof.

Additional embodiments of the disclosure will be set forth in part in the description which follows and, in part, will be obvious from the description, or may be learned by practice of the disclosure.

In accordance with an embodiment of the disclosure, a vehicle includes an air conditioner, a plurality of odor sensing modules provided in an interior of the vehicle or inside the air conditioner and including a plurality of gas sensors, and a controller to determine whether to initiate a process of determining occurrence of a bad smell based on at least one of state information of the vehicle and state information of the air conditioner, determine odor data based on output of at least one of the plurality of odor sensing modules when the process of determining the occurrence of the bad smell is initiated, and control to provide notice of or remove the bad smell when it is identified that the bad smell has occurred based on the odor data.

The controller may determine whether the bad smell occurs based on at least one of a bad smell gas concentration of the odor data or an odor pattern of the odor data.

The controller may determine whether the bad smell occurs between one odor sensing module of the plurality of odor sensing modules and the other odor sensing module of the plurality of odor sensing modules, based on a difference value between the odor data of the one odor sensing module and the odor data of the other odor sensing module.

The controller may control to open at least one of a door, a window, a sunroof, and a trunk to remove the bad smell when it is determined that the bad smell has occurred.

The controller may determine whether to open at least one of the door, the window, the sunroof, and the trunk based on at least one of weather information and parking information of the vehicle.

The controller may adjust an open time of at least one of the door, the window, the sunroof, and the trunk in proportion to a bad smell gas concentration.

The vehicle may further include a user interface, wherein the controller may control the user interface to provide notice of the occurrence of the bad smell when it is determined that the bad smell has occurred.

The vehicle may further include a communication device, wherein the controller may control the communication device to transmit a message to provide notice of the occurrence of the bad smell to an external device when it is determined that the bad smell has occurred.

The plurality of odor sensing modules may include a first odor sensing module provided on one side of a suction port of the air conditioner and a second odor sensing module provided between a filter for filtering outside air sucked through the suction port and an evaporator for performing heat exchange with air passed through the filter, and when the air conditioner is switched to an indoor mode, the controller may determine whether the bad smell occurs in the filter based on a difference value between odor data of the second odor sensing module and odor data of the first odor sensing module.

The plurality of odor sensing modules may further include a third odor sensing module provided between the evaporator and the heater, and when the air conditioner is switched to the indoor mode, an A/C (air conditioning) function of the air conditioner is activated and a blower motor of the air conditioner operates, and the controller may determine whether the bad smell occurs in the evaporator based on a difference value between odor data of the third odor sensing module and the odor data of the second odor sensing module.

The plurality of odor sensing modules may further include a fourth odor sensing module provided between the heater and a vent for guiding air in the air conditioner into the interior of the vehicle, and when the air conditioner is switched to the indoor mode, the A/C (air conditioning) function of the air conditioner is deactivated and the blower motor of the air conditioner operates, and the controller may determine whether the bad smell occurs in the heater based on a difference value between odor data of the fourth odor sensing module and the odor data of the third odor sensing module.

The plurality of odor sensing modules may further include a fifth odor sensing module provided on one side of the vent and a sixth odor sensing module provided in the interior of the vehicle, and when the door and window of the vehicle are closed, the controller may determine whether the bad smell occurs in the interior of the vehicle based on a difference value between odor data of the sixth odor sensing module and odor data of the fifth odor sensing module.

The controller may determine that the bad smell does not occur in the interior of the vehicle in at least one situation of driving of the vehicle in a polluted place, an opening of a fuel port of the vehicle, and ejection of washer fluid of the vehicle.

The plurality of odor sensing modules may further include a seventh odor sensing module provided in a trunk of the vehicle, and when the trunk of the vehicle is closed, the controller may determine whether the bad smell occurs in the trunk of the vehicle based on odor data of the seventh odor sensing module.

In accordance with another embodiment of the disclosure, a control method of a vehicle including an air conditioner includes determining whether to initiate a process of determining occurrence of a bad smell based on at least one of state information of the vehicle and state information of the air conditioner, determining odor data based on output of at least one of a plurality of odor sensing modules provided in an interior of the vehicle or inside the air conditioner and including a plurality of gas sensors when the process of determining the occurrence of the bad smell is initiated, and controlling to provide notice of or remove the bad smell when it is identified that the bad smell has occurred based on the odor data.

The control method may further include determining whether the bad smell occurs based on at least one of a bad smell gas concentration of the odor data or an odor pattern of the odor data.

The control method may further include determining whether the bad smell occurs between one odor sensing module of the plurality of odor sensing modules and the other odor sensing module of the plurality of odor sensing modules, based on a difference value between the odor data of the one odor sensing module and the odor data of the other odor sensing module.

The controlling to provide notice of or remove the bad smell may include controlling to open at least one of a door, a window, a sunroof, and a trunk to remove the bad smell when it is determined that the bad smell has occurred.

The controlling to provide notice of or remove the bad smell may include determining whether to open at least one of the door, the window, the sunroof, and the trunk based on at least one of weather information and parking information of the vehicle.

The controlling to provide notice of or remove the bad smell may include adjusting an open time of at least one of the door, the window, the sunroof, and the trunk in proportion to a bad smell gas concentration.

BRIEF DESCRIPTION OF THE DRAWINGS

These and/or other embodiments of the disclosure will become apparent and more readily appreciated from the following description of exemplary embodiments, taken in conjunction with the accompanying drawings, in which:

FIG. 3 is a diagram for describing a case in which the vehicle determines whether a bad smell occurs according to an embodiment;

FIG. 6 is a diagram for describing a case in which the vehicle determines whether a bad smell occurs in an evaporator according to an embodiment;

FIG. 8 is a diagram for describing a case in which the vehicle determines whether a bad smell occurs in an interior of the vehicle according to an embodiment;

DETAILED DESCRIPTION OF ILLUSTRATIVE EMBODIMENTS

Figure 1:
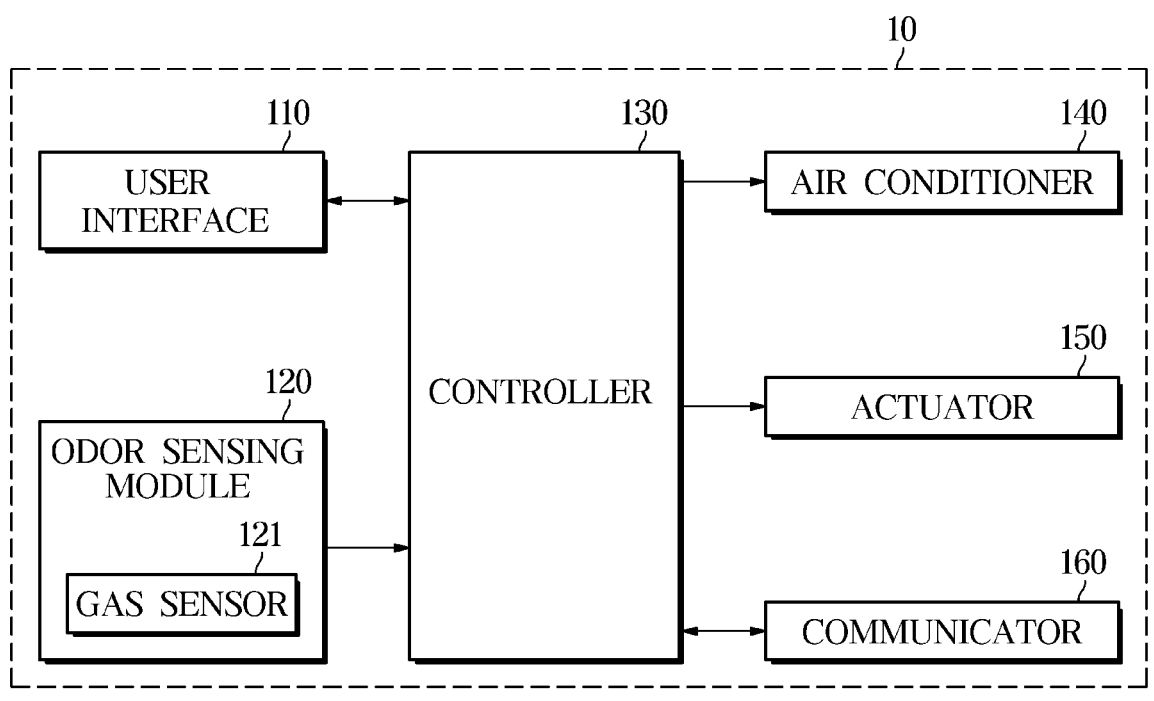
FIG. 1 is a control block diagram of a vehicle according to an embodiment.

Throughout the specification, like reference numerals refer to like elements. This specification does not describe all the elements of the embodiments, and duplicative contents between general contents or embodiments in the technical field of the present disclosure will be omitted.

Throughout this specification, when a portion is "connected" to another portion, this includes the case in which the portion is indirectly connected to the other portion, as well as the case in which the portion is directly connected to the other portion, and the indirect connection includes a connection through a wireless communication network.

When it is described that a part "includes" an element, it means that the element may further include other elements, not excluding the other elements unless specifically stated otherwise.

The singular expression includes the plural expression unless the context clearly dictates otherwise.

Terms such as "~unit", "~part," "~block," "~member," "~module," and the like may denote a unit for processing at least one function or operation. For example, the terms may refer to at least one hardware such as a field-programmable gate array (FPGA)/an application specific integrated circuit (ASIC), at least one software stored in a memory, or at least one process processed by a processor.

Identification numerals assigned to steps are used to identify the steps, the identification numerals do not indicate the order of the steps, and each step may be performed differently from the specified order unless the context clearly indicates a specific order.

Hereinafter, embodiments of a vehicle and a control method thereof will be described in detail with reference to the accompanying drawings.

Figure 2:
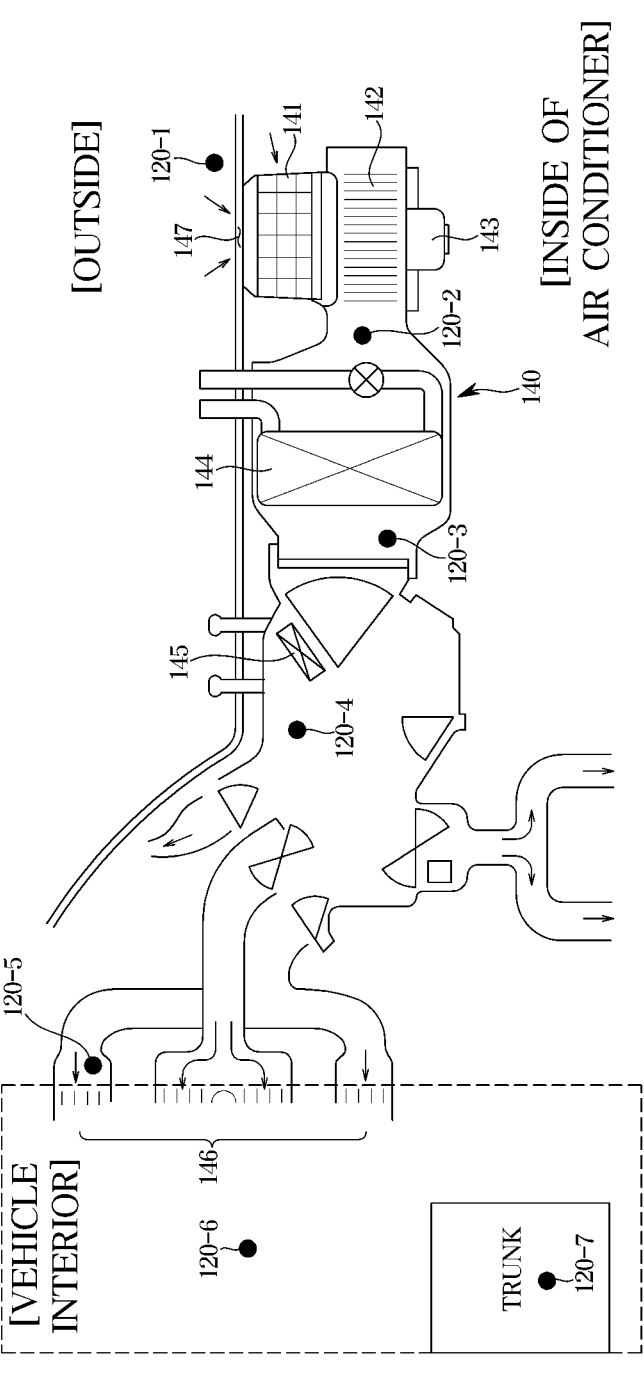
FIG. 2 is a diagram for explaining an arrangement position of an odor sensing module according to an embodiment.

FIG. 1 is a control block diagram of a vehicle 10 according to an embodiment, and FIG. 2 is a diagram for explaining an arrangement position of an odor sensing module 120 according to an embodiment.

Referring to FIG. 1, a vehicle 10 according to an embodiment includes a user interface 110 capable of receiving user input and displaying information, an odor sensing module 120 including a plurality of gas sensors 121 to detect a gas concentration, a controller 130 capable of determining an odor based on an output of the odor sensing module 120 and determining whether a bad smell occurs, an air conditioner 140 capable of performing air conditioning in the vehicle 10, an actuator 150 capable of opening and closing a window, a door, a sunroof, or a trunk, etc., and a communication device (e.g., a communicator) 160 capable of performing communication with an external device.

The user interface no according to an embodiment may receive a user input, and to this end, may include a known type of input device. For example, the user interface no may receive, from a user, a gas concentration reference value for determining a bad smell or a setting for an odor pattern of a bad smell.

In addition, the user interface no according to an embodiment may display information, and to this end, may include a known type of display panel. For example, the user interface 110 may display a message to provide notice of the occurrence of a bad smell when it is determined that the bad smell has occurred.

The odor sensing module 120 according to an embodiment includes the plurality of gas sensors 121, and the plurality of gas sensors 121 may detect concentrations of different types of gases, respectively. For example, the plurality of gas sensors 121 may be arranged in an array to measure the concentration of gas introduced into the odor sensing module 120.

The gas sensor 121 may be provided as an electric gas sensor, a chemical gas sensor, or a bio-peptide gas sensor, and the type thereof is not limited.

Although not shown, the odor sensing module 120 may further include a pump or a suction fan for sucking gas, and may further include a fan for discharging gas.

In particular, a plurality of the odor sensing modules 120 may be provided, and may be provided at different positions in an interior of the vehicle 10 or in the air conditioner 140.

Specifically, as illustrated in FIG. 2, the plurality of odor sensing modules 120 may include a first odor sensing module 120-1 provided on one side of a suction port 147 of the air conditioner 140, a second odor sensing module 120-2 provided between a filter 141 for filtering outside air sucked through the suction poll 147 and an evaporator 144 for performing heat exchange with air passed through the filter 141, a third odor sensing module 120-3 provided between the evaporator 144 and a heater 145, a fourth odor sensing module 120-4 provided between the heater 145 and a vent 146 for guiding air in the air conditioner 140 to the interior of the vehicle 10, a fifth odor sensing module 120-5 provided on one side of the vent 146, a sixth odor sensing module 120-6 provided in the interior of the vehicle 10, and a seventh odor sensing module 120-7 provided in the trunk of the vehicle 10.

As such, the plurality of odor sensing modules 120 may be provided at different positions to detect gas concentrations at different positions.

The controller 130 according to an embodiment may determine whether to initiate a process of determining occurrence of a bad smell based on at least one of state information of the vehicle 10 and state information of the air conditioner 140.

The state information of the vehicle 10 may be information on whether a window, door, sunroof, or trunk of the vehicle 10 is opened or closed, and may be transmitted to the controller 130 through a vehicle network (e.g., a controller area network (CAN)).

In addition, the state information of the air conditioner 140 may include at least one of information on indoor and outdoor modes of the air conditioner 140, information on whether an A/C (air conditioning) function of the air conditioner 140 is activated, and information on wind volume of the air conditioner 140, and may be transmitted to the controller 130 through the vehicle network (e.g., a controller area network (CAN)).

For example, the controller 130 may control to determine whether a bad smell occurs in the filter 141 when the air conditioner 140 is switched to the indoor mode.

The controller 130 may also control to determine whether a bad smell occurs in the evaporator 144 when the air conditioner 140 is in the indoor mode, the A/C function of the air conditioner 140 is activated, and a blower motor 143 of the air conditioner 140 operates.

The controller 130 may also control to determine whether a bad smell occurs in the heater 145 when the air conditioner 140 is in the indoor mode, the A/C function of the air conditioner 140 is deactivated, and the blower motor 143 of the air conditioner 140 operates.

The controller 130 may also control to determine whether a bad smell occurs in the interior of the vehicle 10 when the door and window of the vehicle 10 are closed.

The controller 130 may also control to determine whether a bad smell occurs in the trunk of the vehicle 10 when the trunk of the vehicle 10 is closed.

The controller 130 according to an embodiment may determine odor data based on the output of at least one of the plurality of odor sensing modules 120 when the process of determining occurrence of a bad smell is initiated.

Specifically, the controller 130 may determine the odor data with an output value of each of the plurality of gas sensors 121 included in one of the odor sensing modules 120. That is, the controller 130 may identify pattern data corresponding to an output pattern by comparing the output pattern formed by the output value of each of the plurality of gas sensors 121 with learned pattern data, and determine an odor corresponding to the identified pattern data as an odor identified at the position of the odor sensing module 120.

For example, the controller 130 may guide and learn a neural network based on an odor and output of the gas sensor 121 for the odor and then identify the odor based on output of the neural network to which the output of the gas sensor 121 is input.

In this case, the controller 130 may determine whether a bad smell occurs based on at least one of a bad smell gas concentration in the odor data and an odor pattern of the odor data.

That is, the controller 130 may determine that a bad smell has occurred when the bad smell gas concentration in the odor data is greater than or equal to a preset reference value or the odor pattern of the odor data corresponds to the odor pattern of the bad smell.

In this case, according to an embodiment, the controller 130 may determine whether a bad smell occurs between one odor sensing module of the plurality of odor sensing modules 120 and the other odor sensing module of the plurality of odor sensing modules 120, based on a difference value between the odor data of the one odor sensing module and the odor data of the other odor sensing module.

That is, when the gas concentration on the odor pattern indicated by the difference value between the odor data of the odor sensing modules different from each other is greater than or equal to the bad smell gas concentration reference value, the controller 130 may determine that a bad smell has occurred in a component between the odor sensing modules different from each other.

In addition, when the odor pattern indicated by the difference value between the odor data of the odor sensing modules different from each other corresponds to the odor pattern of the bad smell, the controller 130 may determine that a bad smell has occurred in a component between the odor sensing modules different from each other.

For example, the controller 130 may determine whether a bad smell occurs in the filter 141 based on a difference value between odor data of the second odor sensing module 120-2 and odor data of the first odor sensing module 120-1.

The controller 130 may also determine whether a bad smell occurs in the evaporator 144 based on a difference value between odor data of the third odor sensing module 120-3 and the odor data of the second odor sensing module 120-2.

The controller 130 may also determine whether a bad smell occurs in the heater 145 based on a difference value between odor data of the fourth odor sensing module 120-4 and the odor data of the third odor sensing module 120-3.

The controller 130 may also determine whether a bad smell occurs in the interior of the vehicle 10 based on a difference value between odor data of the sixth odor sensing module 120-6 and odor data of the fifth odor sensing module 120-5.

However, even in the case in which the bad smell gas concentration on the odor pattern indicated by the difference value between the odor data of the sixth odor sensing module 120-6 and the odor data of the fifth odor sensing module 120-5 is greater than or equal to the reference value or the odor pattern indicated by the difference value corresponds to the odor pattern of the bad smell, the controller 130 may determine that a bad smell does not occur in the interior of the vehicle 10 when it is determined that the bad smell occurs due to an external factor of the vehicle 10.

For example, the controller 130 may determine that a bad smell does not occur in the interior of the vehicle 10 in at least one situation of driving of the vehicle 10 in a polluted place (e.g., a livestock barn, an industrial complex, or the like), an opening of a fuel port of the vehicle 10, and ejection of washer fluid of the vehicle 10.

The controller 130 according to an embodiment may also determine whether a bad smell occurs in the trunk of the vehicle 10 based on odor data of the seventh odor sensing module 120-7.

The controller 130 according to an embodiment may control the actuator 150 to open at least one of the door, a window, the sunroof, and the trunk to remove a bad smell when it is determined that the bad smell has occurred.

In this case, according to an embodiment, the controller 130 may determine whether to open at least one of the door, the window, the sunroof, and the trunk based on at least one of weather information and parking information of the vehicle 10.

According to an embodiment, the controller 130 may also adjust an open time of at least one of the door, the window, the sunroof, and the trunk in proportion to a concentration of a bad smell gas.

The controller 130 according to an embodiment may control the user interface no to provide notice of the occurrence of a bad smell when it is determined that the bad smell has occurred.

The controller 130 according to an embodiment may control the communication device 160 to transmit a message to provide notice of the occurrence of a bad smell to an external device when it is determined that the bad smell has occurred. For example, the external device may correspond to a server (e.g., a server of a car sharing service company or an autonomous driving management server) that manages a plurality of the vehicles 10, and may, through this, remotely detect and take action on the occurrence of odors without a manager resident in a shared vehicle and an autonomous vehicle.

The controller 130 may include at least one memory in which a program for performing the above-described operation and an operation, which will be described later, is stored, and at least one processor for executing the stored program. In a case in which a plurality of the memories and processors is provided, they may be integrated on a single chip, or may be physically separated from each other.

The air conditioner 140 according to an embodiment may perform air conditioning in the interior of the vehicle 10, and to this end, as illustrated in FIG. 2, may include the suction port 147 through which outside air is sucked, the filter 141 for filtering out foreign substances from the sucked outside air, a blower fan 142 and the blower motor 143 for generating an intake airflow, the evaporator 144 for cooling the air passed through the filter 141 through heat exchange, the heater 145 for supplying heat to the air passed through the filter 141, and the vent 146 for guiding air in the air conditioner 140 to the interior of the vehicle 10.

The actuator 150 according to an embodiment may be provided on one side of each of the door, window, sunroof, and trunk to open and close each of the door, window, sunroof, and trunk. To this end, the actuator 150 may be provided as an actuator of a known type that may open and close each component.

The communication device 160 according to an embodiment may transmit a message to provide notice of the occurrence of a bad smell in the vehicle 10 to an external device when it is determined that the bad smell has occurred in the vehicle 10.

According to an embodiment, the communication device 160 may also receive a signal for commanding the vehicle 10 to be put into a repair shop from the external device.

To this end, the communication device 160 may be provided as a known type of wireless communication module.

Each component of the vehicle 10 has been described above. Hereinafter, the determination of whether a bad smell occurs in the vehicle 10 will be described in detail.

FIG. 3 is a diagram for describing a case in which the vehicle 10 determines whether a bad smell occurs according to an embodiment.

Referring to FIG. 3, the vehicle 10 may determine odor data based on the output of at least one of the plurality of odor sensing modules 120 when the process of determining the occurrence of a bad smell is initiated.

Specifically, the vehicle 10 may determine the odor data with the output value of each of the plurality of gas sensors 121 included in one of the odor sensing modules 120. That is, the vehicle 10 may identify the pattern data corresponding to the output pattern by comparing the output pattern formed by the output value of each of the plurality of gas sensors 121 with the learned pattern data and determine the odor corresponding to the identified pattern data as an odor identified at the position of the odor sensing module 120.

For example, the vehicle 10 may guide and learn the neural network based on the odor and the output of the gas sensor 121 for the odor and then identify the odor based on the output of the neural network to which the output of the gas sensor 121 is input.

As illustrated in FIG. 3, the pattern of the odor data may mean a pattern formed by outputs of the plurality of gas sensors 121 constituting one of the odor sensing modules 120. That is, the pattern may mean a relationship between the outputs of the plurality of gas sensors 121 and may be expressed as a radar chart, a time series graph, a donut graph, etc., expressed with output values of the plurality of gas sensors 121. As an example, FIG. 3 illustrates the pattern by expressing the output values of the plurality of gas sensors 121 in the radar chart.

In this case, the vehicle 10 may determine whether a bad smell occurs based on at least one of the bad smell gas concentration of the odor data and the odor pattern of the odor data.

That is, the vehicle 10 may determine that a bad smell has occurred when the bad smell gas concentration in the odor data is greater than or equal to the preset reference value or the odor pattern of the odor data corresponds to the odor pattern of the bad smell.

In this case, the reference value of the bad smell gas concentration may be changed by a user through the user interface no, so that sensitivity for each user may be adjusted. In addition, the reference value of the bad smell gas concentration may be preset for each user and may be set to a value corresponding to a user who rents the vehicle 10.

In addition, the reference value of the bad smell gas concentration may be set differently depending on a degree of aging of the vehicle 10, and for example, the higher the degree of aging, the lower the reference value of the bad smell gas concentration, so bad smell management may be strictly carried out.

In addition, when the vehicle 10 is used for a car-sharing service, the reference value of the bad smell gas concentration is set to a lower value than that when the vehicle 10 is a personal vehicle, so the bad smell management may be strictly carried out.

In this case, according to an embodiment, as illustrated in FIG. 3, the vehicle 10 may determine whether a bad smell occurs between one odor sensing module of the plurality of odor sensing modules 120 and the other odor sensing module of the plurality of odor sensing modules 120, based on the difference value between the odor data of the one odor sensing module and the odor data of the other odor sensing module.

That is, when the gas concentration on the odor pattern indicated by the difference value between the odor data of the odor sensing modules different from each other is greater than or equal to the bad smell gas concentration reference value, the vehicle 10 may determine that a bad smell has occurred in a component between the odor sensing modules different from each other.

In addition, when the odor pattern indicated by the difference value between the odor data of the odor sensing modules different from each other corresponds to the odor pattern of the bad smell, the vehicle 10 may determine that a bad smell has occurred in a component between the odor sensing modules different from each other.

Figure 4:
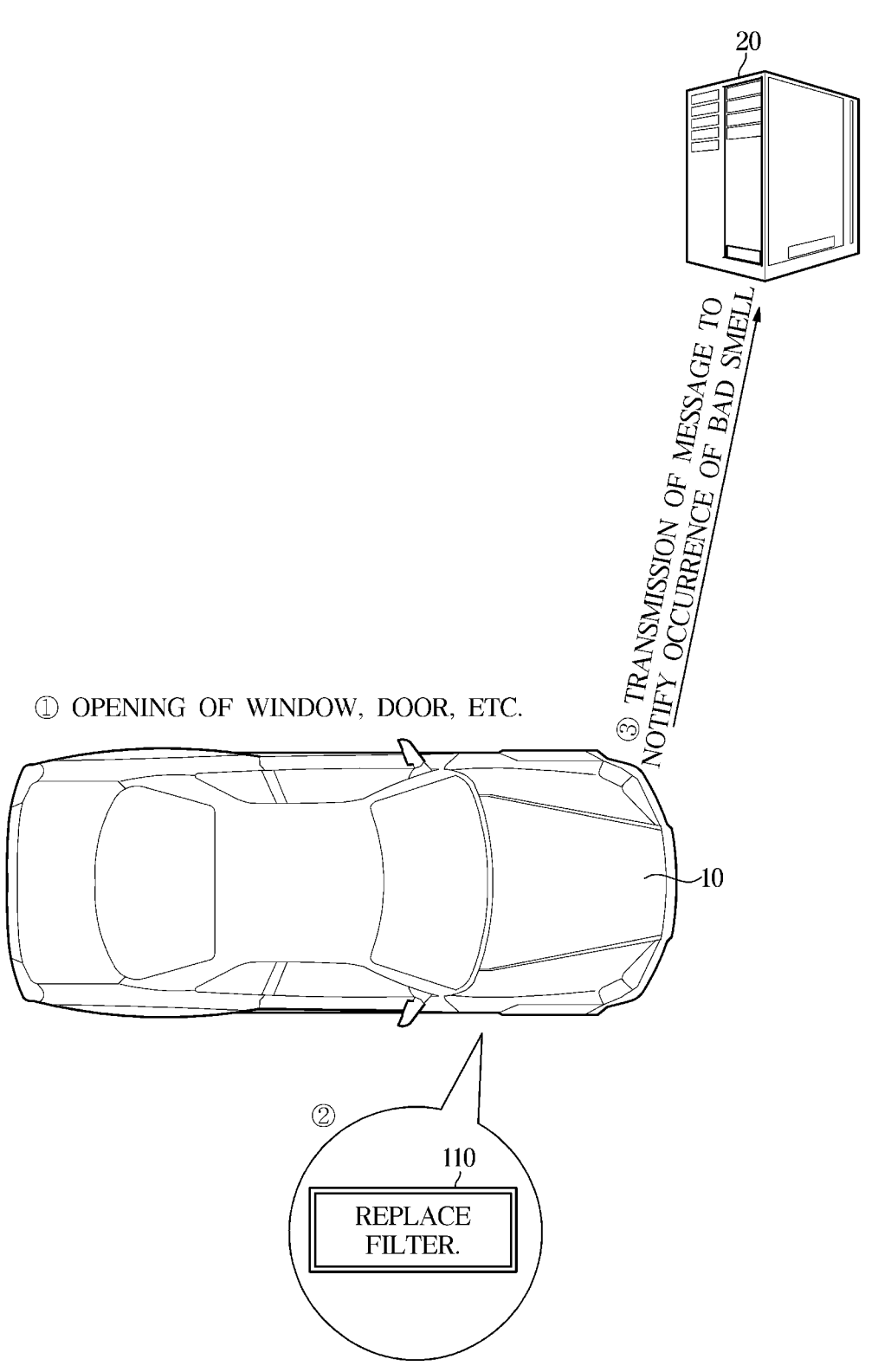
FIG. 4 is a diagram for explaining an operation of the vehicle when a bad smell occurs according to an embodiment.

FIG. 4 is a diagram for explaining an operation of the vehicle 10 when a bad smell occurs according to an embodiment.

Referring to FIG. 4, the vehicle 10 according to an embodiment may control the actuator 150 to open at least one of the door, the window, the sunroof, and the trunk to remove a bad smell when it is determined that the bad smell has occurred.

In this case, according to an embodiment, the vehicle 10 may determine whether to open at least one of the door, the window, the sunroof, and the trunk based on at least one of the weather information and parking information of the vehicle 10 and determine an open time of the at least one of the door, the window, the sunroof, and the trunk.

For example, the vehicle 10 may control to open at least one of the door, the window, and the sunroof based on at least one of the weather information and the parking information when it is determined that a bad smell has occurred in the interior of the vehicle 10. That is, the vehicle 10 may control to open the window or the sunroof when the vehicle

10 is driving in non-rainy weather and control to open at least one of the window, the sunroof, and the door when the vehicle 10 is parked in non-rainy weather. The vehicle 10 may also control not to open the window, the sunroof, and the door, conversely, in case of rainy weather.

In a case in which it is determined that a bad smell (e.g., food odor) has occurred in the trunk of the vehicle 10, the vehicle 10 may control to open the trunk when the vehicle 10 is parked in non-rainy weather.

The vehicle 10 according to an embodiment may also control the user interface no to provide notice of the occurrence of a bad smell when it is determined that the bad smell has occurred. For example, as illustrated in FIG. 4, the vehicle 10 may control the user interface 110 to output a message to guide replacement of the filter 141 when the occurrence of the bad smell in the filter 141 is identified.

The vehicle 10 according to an embodiment may also control the communication device 160 to transmit a message to provide notice of the occurrence of a bad smell to an external device 20 when it is determined that the bad smell has occurred. For example, the external device 20 may correspond to a server that manages a car-sharing service and may receive a message notifying of the occurrence of bad smells from vehicles in order to manage whether or not bad smells occur in the vehicles belonging to the car-sharing service. In this case, the external device 20 may transmit a warehousing command to the vehicle 10 so that the corresponding vehicle 10 in which the bad smell has occurred may be put into a garage or a repair shop for maintenance, and may display the corresponding vehicle 10 as being washed in a rental car list so that the corresponding vehicle 10 is excluded from a search target of a customer.

In the above, it has been described in detail that the vehicle 10 determines whether a bad smell occurs and treats it. Hereinafter, a specific embodiment in which the vehicle 10 determines whether a bad smell occurs will be described in detail.

Figure 5:
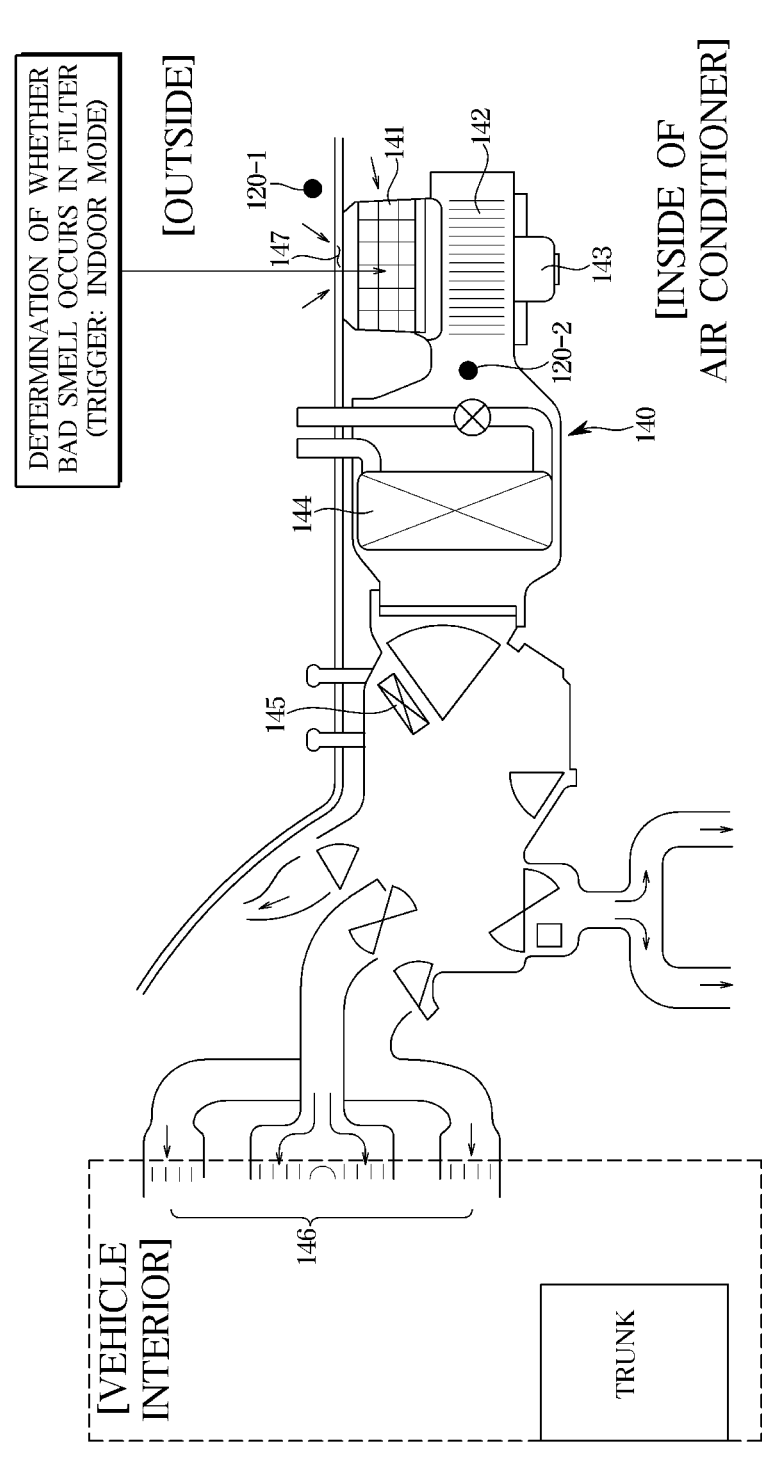
FIG. 5 is a diagram for describing a case in which the vehicle determines whether a bad smell occurs in a filter according to an embodiment.
Figure 7:
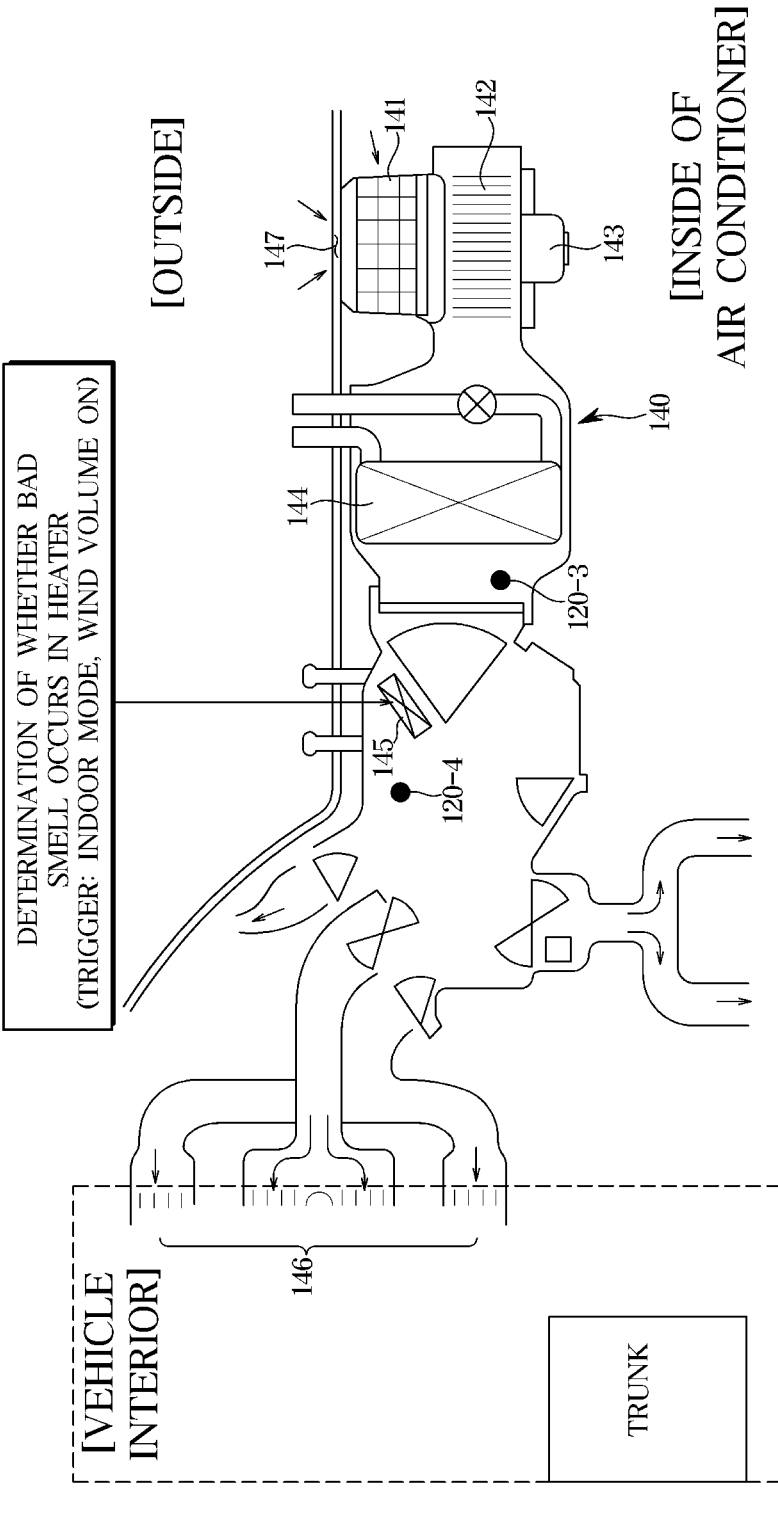
FIG. 7 is a diagram for describing a case in which the vehicle determines whether a bad smell occurs in a heater according to an embodiment.
Figure 9:
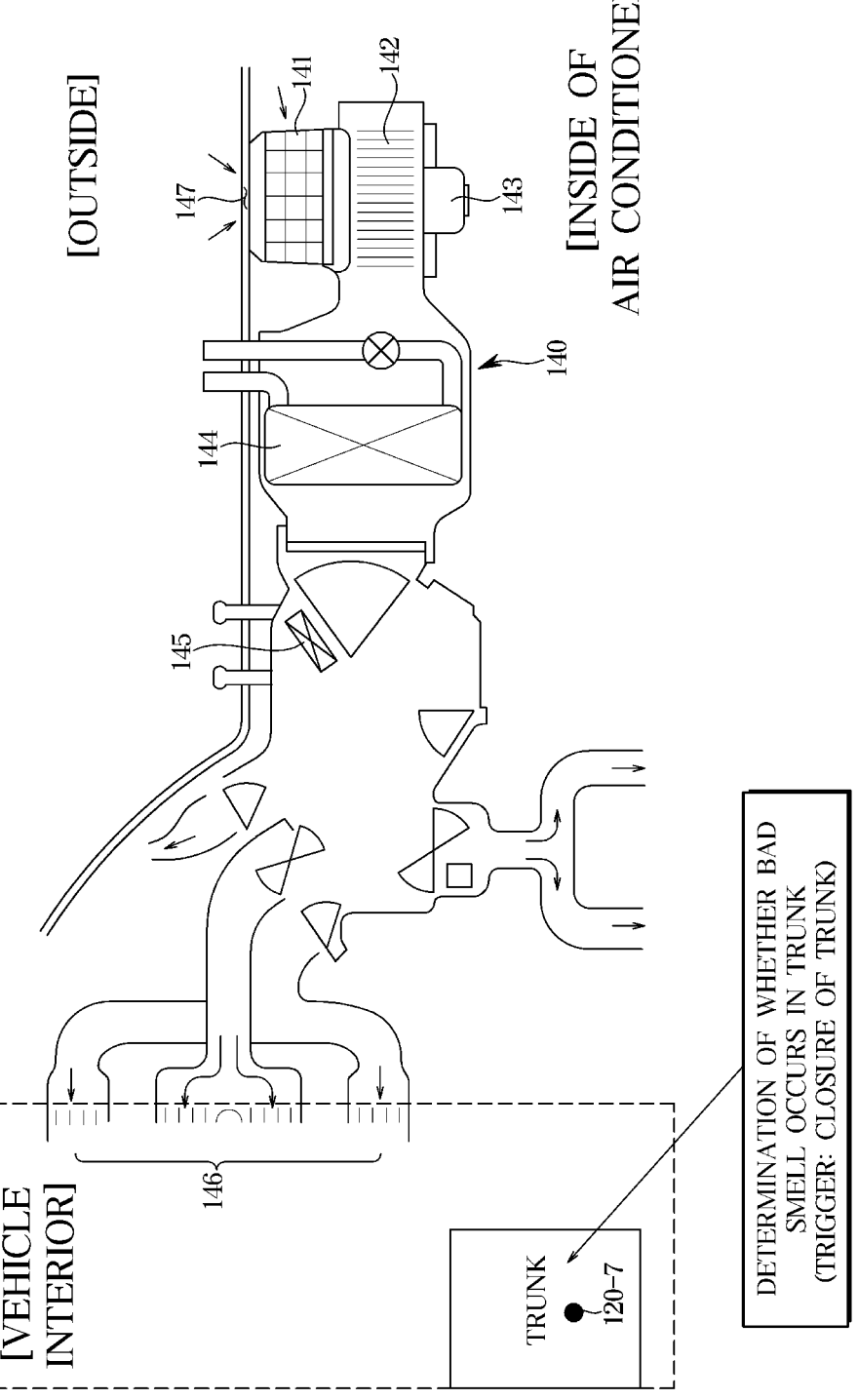
FIG. 9 is a diagram for describing a case in which the vehicle determines whether a bad smell occurs in a trunk according to an embodiment.

FIG. 5 is a diagram for describing a case in which the vehicle 10 determines whether a bad smell occurs in the filter 141 according to an embodiment, FIG. 6 is a diagram for describing a case in which the vehicle 10 determines whether a bad smell occurs in the evaporator 144 according to an embodiment, FIG. 7 is a diagram for describing a case in which the vehicle 10 determines whether a bad smell occurs in the heater 145 according to an embodiment, FIG. 8 is a diagram for describing a case in which the vehicle 10 determines whether a bad smell occurs in the interior of the vehicle 10 according to an embodiment, and FIG. 9 is a diagram for describing a case in which the vehicle 10 determines whether a bad smell occurs in the trunk according to an embodiment.

Referring to FIGS. 5 to 9, the vehicle 10 according to an embodiment may determine whether to initiate the process of determining the occurrence of a bad smell based on at least one of the state information of the vehicle 10 and the state information of the air conditioner 140.

The state information of the vehicle 10 may be information on whether the window, door, sunroof, or trunk of the vehicle 10 is opened or closed, and may be transmitted to the controller 130 through the vehicle network (e.g., a controller area network (CAN)).

In addition, the state information of the air conditioner 140 may include at least one of the information on the indoor and outdoor modes of the air conditioner 140, the information on whether the A/C (air conditioning) function of the air conditioner 140 is activated, and the information on the wind volume of the air conditioner 140, and may be transmitted to the controller 130 through the vehicle network (e.g., a controller area network (CAN)).

For example, as illustrated in FIG. 5, the vehicle 10 may control to determine whether a bad smell occurs in the filter 141 when the air conditioner 140 is switched to the indoor mode.

In this case, the vehicle 10 may determine whether a bad smell occurs in the filter 141 based on the difference value between the odor data of the second odor sensing module 120-2 and the odor data of the first odor sensing module 120-1.

As illustrated in FIG. 6, the vehicle 10 may also control to determine whether a bad smell occurs in the evaporator 144 when the air conditioner 140 is in the indoor mode, the A/C function of the air conditioner 140 is activated, and the blower motor 143 of the air conditioner 140 operates.

In this case, the vehicle 10 may determine whether a bad smell occurs in the evaporator 144 based on the difference value between the odor data of the third odor sensing module 120-3 and the odor data of the second odor sensing module 120-2.

As illustrated in FIG. 7, the vehicle 10 may also control to determine whether a bad smell occurs in the heater 145 when the air conditioner 140 is in the indoor mode, the A/C function of the air conditioner 140 is deactivated, and the blower motor 143 of the air conditioner 140 operates.

In this case, the vehicle 10 may determine whether a bad smell occurs in the heater 145 based on the difference value between the odor data of the fourth odor sensing module 120-4 and the odor data of the third odor sensing module 120-3.

As illustrated in FIG. 8, the vehicle 10 may also control to determine whether a bad smell occurs in the interior of the vehicle 10 when the door and window of the vehicle 10 are closed. However, according to the embodiment, in a case in which there is a sunroof and the sunroof is closed in addition to the door and window, the vehicle 10 may control to determine whether a bad smell occurs in the interior of the vehicle 10. According to the embodiment, the vehicle 10 may also control to determine whether a bad smell occurs in the interior of the vehicle 10 in further consideration of at least one condition of termination of an engine of the vehicle 10 and exiting of an occupant in addition to closing the door and window of the vehicle 10.

In this case, the vehicle 10 may determine whether a bad smell occurs in the interior of the vehicle 10 based on the difference value between the odor data of the sixth odor sensing module 120-6 and the odor data of the fifth odor sensing module 120-5.

However, even in the case in which the bad smell gas concentration on the odor pattern indicated by the difference value between the odor data of the sixth odor sensing module 120-6 and the odor data of the fifth odor sensing module 120-5 is greater than or equal to the reference value or the odor pattern indicated by the difference value corresponds to the odor pattern of the bad smell, the vehicle 10 may determine that a bad smell does not occur in the interior of the vehicle 10 when it is determined that the bad smell occurs due to an external factor of the vehicle 10.

For example, the vehicle 10 may determine that a bad smell does not occur in the interior of the vehicle 10 in at least one situation of the driving of the vehicle 10 in a polluted place (e.g., a livestock barn, an industrial complex, or the like), an opening of the fuel port of the vehicle 10, and ejection of washer fluid of the vehicle 10.

As illustrated in FIG. 9, the vehicle 10 may also control to determine whether a bad smell occurs in the trunk of the vehicle 10 when the trunk of the vehicle 10 is closed.

In this case, the vehicle 10 may determine whether a bad smell occurs in the trunk of the vehicle 10 based on the odor data of the seventh odor sensing module 120-7.

Hereinafter, an embodiment of a control method of the vehicle 10 will be described. The vehicle 10 according to the above-described embodiment may be used in the control method of the vehicle 10. Accordingly, the contents described above with reference to FIGS. 1 to 9 may be equally applied to the control method of the vehicle 10.

Figure 10:
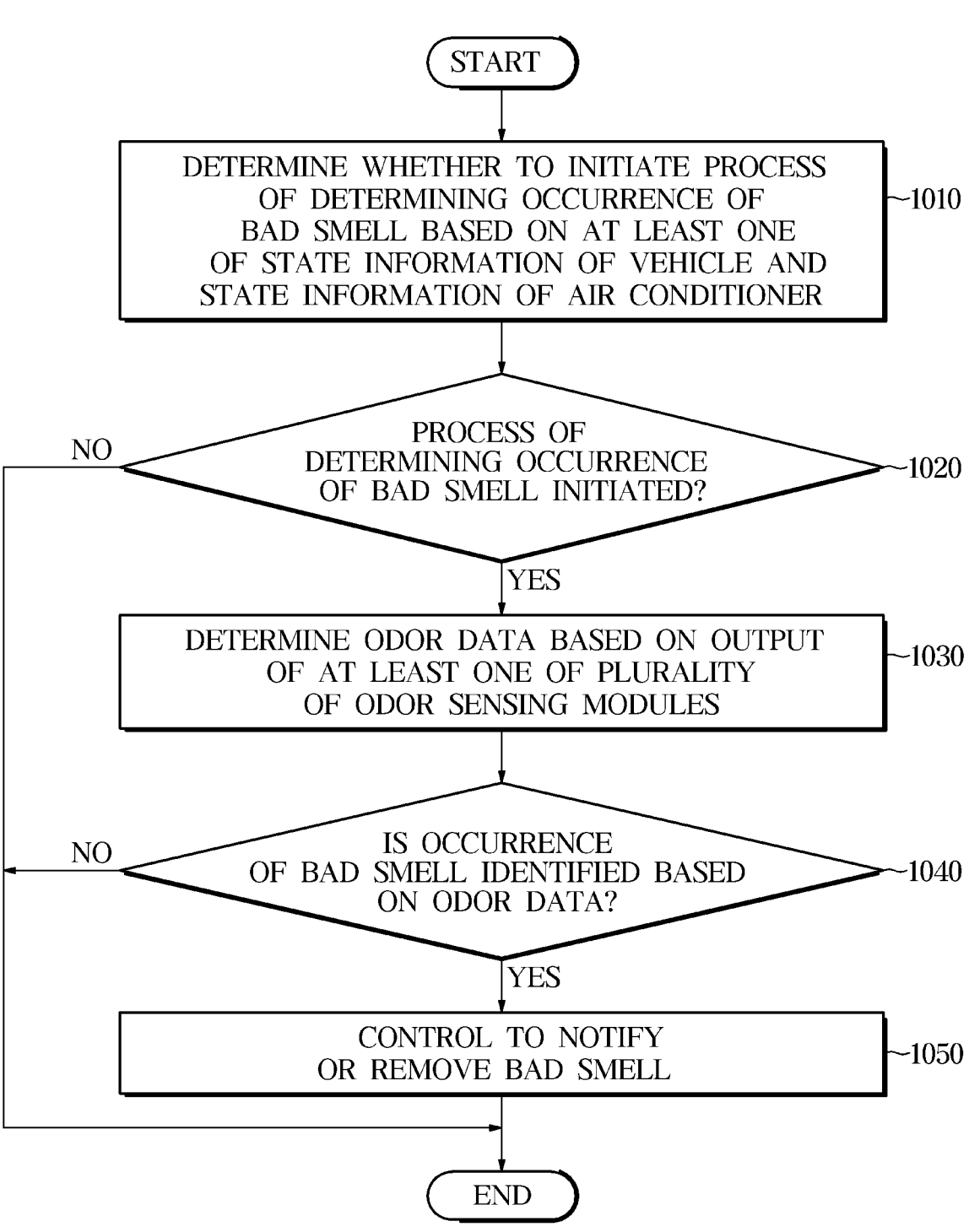
FIG. 10 is a flowchart illustrating a case in which a cause of occurrence of a bad smell in the vehicle is determined in a control method of the vehicle according to an embodiment.

FIG. 10 is a flowchart illustrating a case in which a cause of occurrence of a bad smell in the vehicle 10 is determined in a control method of the vehicle 10 according to an embodiment.

Referring to FIG. 10, the vehicle 10 according to an embodiment may determine whether to initiate the process of determining the occurrence of a bad smell based on at least one of the state information of the vehicle 10 and the state information of the air conditioner 140 (1010).

The state information of the vehicle 10 may be information on whether the window, door, sunroof, or trunk of the vehicle 10 is opened or closed, and may be transmitted to the controller 130 through the vehicle network (e.g., a controller area network (CAN)).

In addition, the state information of the air conditioner 140 may include at least one of the information on the indoor and outdoor modes of the air conditioner 140, the information on whether the A/C (air conditioning) function of the air conditioner 140 is activated, and the information on the wind volume of the air conditioner 140, and may be transmitted to the controller 130 through the vehicle network (e.g., a controller area network (CAN)).

When it is determined that the process of determining the occurrence of a bad smell is initiated (YES in 1020), the vehicle 10 according to an embodiment may determine odor data based on the output of at least one of the plurality of odor sensing modules 120 (1030).

Specifically, the vehicle 10 may determine the odor data with the output value of each of the plurality of gas sensors 121 included in one of the odor sensing modules 120. That is, the vehicle 10 may identify the pattern data corresponding to the output pattern by comparing the output pattern formed by the output value of each of the plurality of gas sensors 121 with the learned pattern data and determine the odor corresponding to the identified pattern data as an odor identified at the position of the odor sensing module 120.

For example, the vehicle 10 may guide and learn the neural network based on the odor and the output of the gas sensor 121 for the odor and then identify the odor based on the output of the neural network to which the output of the gas sensor 121 is input.

In this case, the vehicle 10 may determine whether a bad smell occurs based on at least one of the bad smell gas concentration of the odor data and the odor pattern of the odor data.

That is, the vehicle 10 may determine that a bad smell has occurred when the bad smell gas concentration in the odor data is greater than or equal to the preset reference value or the odor pattern of the odor data corresponds to the odor pattern of the bad smell.

In this case, according to an embodiment, the vehicle 10 may determine whether a bad smell occurs between one odor sensing module of the plurality of odor sensing modules 120 and the other odor sensing module of the plurality of odor sensing modules 120, based on the difference value between the odor data of the one odor sensing module and the odor data of the other odor sensing module.

That is, when the gas concentration on the odor pattern indicated by the difference value between the odor data of the odor sensing modules different from each other is greater than or equal to the bad smell gas concentration reference value, the vehicle 10 may determine that a bad smell has occurred in a component between the odor sensing modules different from each other.

In addition, when the odor pattern indicated by the difference value between the odor data of the odor sensing modules different from each other corresponds to the odor pattern of the bad smell, the vehicle 10 may determine that a bad smell has occurred in a component between the odor sensing modules different from each other.

When it is identified that a bad smell has occurred based on the odor data (YES in 1040), the vehicle 10 according to an embodiment may control to provide notice of or remove the bad smell (1050).

As is apparent from the above, a vehicle and a control method thereof according to embodiments can detect whether a bad smell occurs based on outputs of a plurality of odor sensing modules provided at different positions and provide notice of or remove the occurred bad smell.

The disclosed embodiments may be implemented in the form of a recording medium storing instructions executable by a computer. The instructions may be stored in the form of program code, and when executed by a processor, a program module may be created to perform the operations of the disclosed embodiments. The recording medium may be implemented as a computer-readable recording medium.

The computer-readable recording medium includes any type of recording medium in which instructions readable by the computer are stored. For example, the recording medium may include a read only memory (ROM), a random access memory (RAM), a magnetic tape, a magnetic disk, a flash memory, an optical data storage device, and the like.

The embodiments disclosed with reference to the accompanying drawings have been described above. It will be understood by those skilled in the art that various changes in form and details may be made therein without departing from the spirit and scope of the disclosure as defined by the appended claims. The disclosed embodiments are illustrative and should not be construed as limiting.

What is claimed is:

1. A vehicle comprising:
an air conditioner;
a plurality of odor sensing modules provided in an interior of the vehicle or inside the air conditioner, each of the odor sensing modules comprising a plurality of gas sensors; and
a controller configured to:
determine whether to initiate a process of determining an occurrence of a bad smell based on state information of the vehicle or state information of the air conditioner;
in response to a determination to initiate the process of determining the occurrence of the bad smell, determine odor data based on an output of at least one of the odor sensing modules;
determine whether the bad smell has occurred based on the odor data; and
in response to a determination that the bad smell has occurred, control to provide notice of or to remove the bad smell, wherein the controller is further configured to:
control to open a door, a window, a sunroof, or a trunk to remove the bad smell; and
adjust an open time of the door, the window, the sunroof, or the trunk in proportion to a bad smell gas concentration.

2. The vehicle according to claim 1, wherein the controller is configured to determine whether the bad smell occurs based on the bad smell gas concentration of the odor data or an odor pattern of the odor data.

3. The vehicle according to claim 1, wherein the controller is configured to determine whether the bad smell occurs between a first odor sensing module of the plurality of odor sensing modules and a second odor sensing module of the plurality of odor sensing modules based on a difference value between the odor data of the first odor sensing module and the odor data of the second odor sensing module.

4. The vehicle according to claim 1, wherein the controller is configured to determine whether to open the door, the window, the sunroof, or the trunk based on weather information or parking information of the vehicle.

5. The vehicle according to claim 1, further comprising a user interface, wherein the controller is configured to control the user interface to provide notice of the occurrence of the bad smell.

6. The vehicle according to claim 1, further comprising a communication device, wherein the controller is configured to control the communication device to transmit a message to provide a notice of the occurrence of the bad smell to an external device.

7. The vehicle according to claim 1, wherein:
the plurality of odor sensing modules comprises a first odor sensing module provided on one side of a suction port of the air conditioner and a second odor sensing module provided between a filter for filtering outside air suckable through the suction port and an evaporator for performing heat exchange with air passable through the filter; and
when the air conditioner is switched to an indoor mode, the controller is configured to determine whether the bad smell occurs in the filter based on a difference value between the odor data of the second odor sensing module and the odor data of the first odor sensing module.

8. The vehicle according to claim 7, wherein:
the plurality of odor sensing modules further comprises a third odor sensing module provided between the evaporator and a heater; and
when the air conditioner is switched to the indoor mode, an air conditioning function of the air conditioner is activated, and a blower motor of the air conditioner operates, the controller is configured to determine whether the bad smell occurs in the evaporator based on a difference value between the odor data of the third odor sensing module and the odor data of the second odor sensing module.

9. The vehicle according to claim 8, wherein:
the plurality of odor sensing modules further comprises a fourth odor sensing module provided between the heater and a vent for guiding air in the air conditioner into the interior of the vehicle; and
when the air conditioner is switched to the indoor mode, the air conditioning function of the air conditioner is deactivated, and the blower motor of the air conditioner operates, the controller is configured to determine whether the bad smell occurs in the heater based on a difference value between the odor data of the fourth odor sensing module and the odor data of the third odor sensing module.

10. The vehicle according to claim 9, wherein:

the plurality of odor sensing modules further comprises a fifth odor sensing module provided on one side of the vent and a sixth odor sensing module provided in the interior of the vehicle; and when the door and the window of the vehicle are closed, the controller is configured to determine whether the bad smell occurs in the interior of the vehicle based on a difference value between the odor data of the sixth odor sensing module and the odor data of the fifth odor sensing module.

11. The vehicle according to claim 10, wherein the controller is configured to determine that the bad smell does not occur in the interior of the vehicle in a situation of driving of the vehicle in a polluted place, a situation of an opening of a fuel port of the vehicle, or a situation of ejection of washer fluid of the vehicle.

12. The vehicle according to claim 10, wherein:

the plurality of odor sensing modules further comprises a seventh odor sensing module provided in the trunk of the vehicle; and when the trunk of the vehicle is closed, the controller is configured to determine whether the bad smell occurs in the trunk of the vehicle based on odor data of the seventh odor sensing module.

13. A vehicle comprising:

an air conditioner;

a plurality of odor sensing modules provided in an interior of the vehicle or inside the air conditioner, each of the odor sensing modules comprising a plurality of gas sensors; and a controller configured to:

determine whether to initiate a process of determining an occurrence of a bad smell based on state information of the vehicle or state information of the air conditioner;

in response to a determination to initiate the process of determining the occurrence of the bad smell, determine odor data based on an output of at least one of the odor sensing modules;

determine whether the bad smell has occurred based on the odor data; and in response to a determination that the bad smell has occurred, control to provide notice of or to remove the bad smell, wherein the plurality of odor sensing modules comprises a first odor sensing module provided on one side of a suction port of the air conditioner and a second odor sensing module provided between a filter for filtering outside air suckable through the suction port and an evaporator for performing heat exchange with air passable through the filter, wherein, when the air conditioner is switched to an indoor mode, the controller is configured to determine whether the bad smell occurs in the filter based on a difference value between the odor data of the second odor sensing module and the odor data of the first odor sensing module, wherein the plurality of odor sensing modules further comprises a third odor sensing module provided between the evaporator and a heater, and wherein, when the air conditioner is switched to the indoor mode, an air conditioning function of the air conditioner is activated and a blower motor of the air conditioner operates, the controller is configured to determine whether the bad smell occurs in the evaporator based on a difference value between the odor data of the third odor sensing module and the odor data of the second odor sensing module.

14. The vehicle according to claim 13, wherein the plurality of odor sensing modules further comprises a fifth odor sensing module provided on one side of a vent and a sixth odor sensing module provided in the interior of the vehicle, and wherein, when a door and a window of the vehicle are closed, the controller is configured to determine whether the bad smell occurs in the interior of the vehicle based on a difference value between the odor data of the sixth odor sensing module and the odor data of the fifth odor sensing module.

15. The vehicle according to claim 13, wherein the controller is configured to determine that the bad smell does not occur in the interior of the vehicle in a situation of driving of the vehicle in a polluted place.

16. The vehicle according to claim 13, wherein the controller is configured to determine that the bad smell does not occur in the interior of the vehicle in a situation of an opening of a fuel port of the vehicle.

17. The vehicle according to claim 13, wherein the controller is configured to determine that the bad smell does not occur in the interior of the vehicle in a situation of driving of the vehicle in a situation of an ejection of washer fluid of the vehicle.

18. The vehicle according to claim 13, wherein the plurality of odor sensing modules further comprises a seventh odor sensing module provided in a trunk of the vehicle, and wherein, when the trunk of the vehicle is closed, the controller is configured to determine whether the bad smell occurs in the trunk of the vehicle based on odor data of the seventh odor sensing module.

19. The vehicle according to claim 13, wherein the controller is configured to determine whether the bad smell occurs based on a bad smell gas concentration of the odor data or an odor pattern of the odor data.

20. The vehicle according to claim 13, further comprising a user interface, wherein the controller is configured to control the user interface to provide notice of the occurrence of the bad smell.

* * * * *